(12) United States Patent
Chen

(10) Patent No.: US 7,316,535 B2
(45) Date of Patent: Jan. 8, 2008

(54) SCREW WITH A CONVENIENT SCREW HEAD

(76) Inventor: Ling-Fang Chen, No. 35 Lane 193 Gangshan N Rd, Gangshan Township, Kaohsiung County 820 (TW)

(*) Notice: Subject to any disclaimer, the term of this patent is extended or adjusted under 35 U.S.C. 154(b) by 85 days.

(21) Appl. No.: 11/271,758

(22) Filed: Nov. 14, 2005

(65) Prior Publication Data

US 2007/0110545 A1    May 17, 2007

(51) Int. Cl.
*F16B 23/00* (2006.01)

(52) U.S. Cl. ...................... 411/403; 411/404

(58) Field of Classification Search ............... 411/406, 411/404, 409, 402
See application file for complete search history.

(56) References Cited

U.S. PATENT DOCUMENTS

| | | | | | |
|---|---|---|---|---|---|
| 2,402,342 | A | * | 6/1946 | Phillips | 411/404 |
| 2,445,525 | A | * | 7/1948 | Gulden | 411/404 |
| 2,764,197 | A | * | 9/1956 | Torresen | 81/460 |
| RE24,878 | E | * | 9/1960 | Smith et al. | 411/404 |
| 3,170,364 | A | * | 2/1965 | Johnson et al. | 411/404 |
| 5,957,645 | A | * | 9/1999 | Stacy | 411/404 |
| 7,147,421 | B2 | * | 12/2006 | Suzuki | 411/404 |

* cited by examiner

*Primary Examiner*—Flemming Saether
(74) *Attorney, Agent, or Firm*—Rosenberg, Klein & Lee

(57) ABSTRACT

A screw has a convenient head, wherein an engaging concavity is defined. Said engaging concavity includes a central portion and a plurality of radial recesses disposed around and in communication with the central portion. Each radial recess has two insides with one inside parallels to the extension line and the other inside encloses an angle with the extension line, an end surface and an opening with a smaller width defined on the junction of the recesses and the centre portion.

5 Claims, 9 Drawing Sheets

SCREW WITH A CONVENIENT SCREW HEAD

BACKGROUND OF THE INVENTION

1. Field of the Invention

The present invention relates to a screw with a screw head wherein an engaging concavity is defined, in particularly to accommodate different screw bits.

2. Description of the Related Art

A conventional screw is disclosed by U.S. Pat. No. 2,402,342 in FIGS. 1 and 2, generally includes a head 11, a shank 12 with threads 13. An engaging concavity 111 is defined in a top of the head 11 surrounded by four recesses 112. Each recess 112 includes an end surface 113 and two insides 114 and an opening with a width smaller than said end surface. Due to the limitation of recess number, the screw head only suits for Phillip and slotted screw bit. Further, the recesses 112 are easily broken when the torque focuses on the junction of recesses and central portion.

Refer to U.S. Pat. No. 2,445,978 in FIGS. 3 and 4, a conventional screw generally includes a head 31, a shank 32 with threads 33. An engaging concavity 311 is defined in a top of the head 31 surrounded by six lobes 312. Each lobe 312 includes an end surface 313 and two insides 314 and an opening which has a width equal to the width of the end surface 313. Said two insides 314 are paralleled to each other leading the screw bits easily slip from the engaging concavity 311.

Refer to U.S. Pat. No. 5,364,212 in FIG. 5, a conventional screw generally includes a head 41, a shank 42 with threads 43. An engaging concavity 411 is defined in a top of the head 41 surrounded by four recesses 412. Each recess 412 includes an end surface 413 and two insides 414. Two circumferential faces 415 are further defined between any two adjacent recesses 412. Due to the unique structure of engaging concavity, only particular screw bits can engage the engaging concavity to drive the screw.

The present invention intends to provide a screw head wherein a plurality of radial recesses is defined, each recesses includes two insides without paralleling to each other so as to receive the screw bits with different shapes and sizes

SUMMARY OF THE INVENTION

The present invention relates to a screw with an engaging concavity defined in a top of the head. Said engaging concavity includes a central portion and a plurality of radial recesses located around and in communication with the central portion. Each radial recess includes two insides with one inside parallels to an extension line and the other inside encloses an angle with extension line, an end surface connected between the two insides and an opening with a width smaller than said end surface.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENTS

Figure 1:
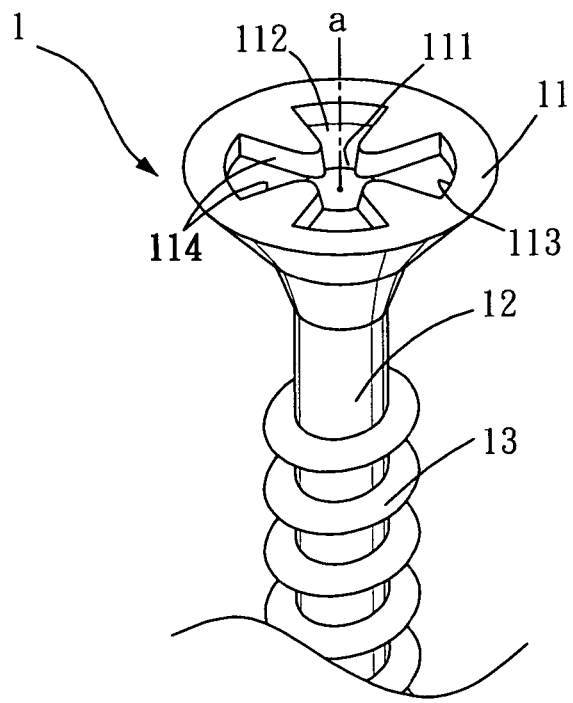
FIG. 1 is a perspective view to show the screw of U.S. Pat. No. 2,402,342.
Figure 2:
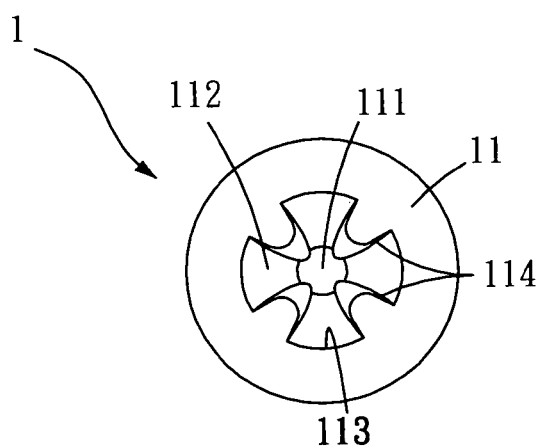
FIG. 2 is a top view of the engaging concavity of the screw of U.S. Pat. No. 2,402,342.
Figure 3:
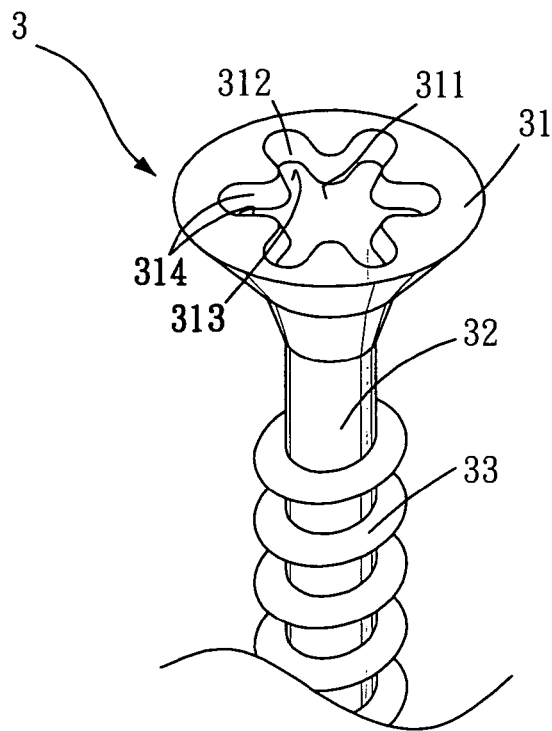
FIG. 3 is a perspective view to show the screw of U.S. Pat. No. 2,445,978.
Figure 4:
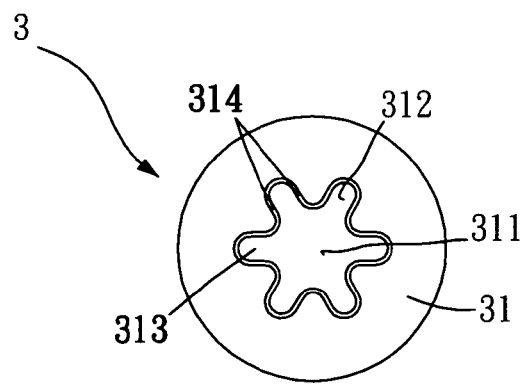
FIG. 4 is a top view of the engaging concavity of the screw of U.S. Pat. No. 2,445,978.
Figure 5:
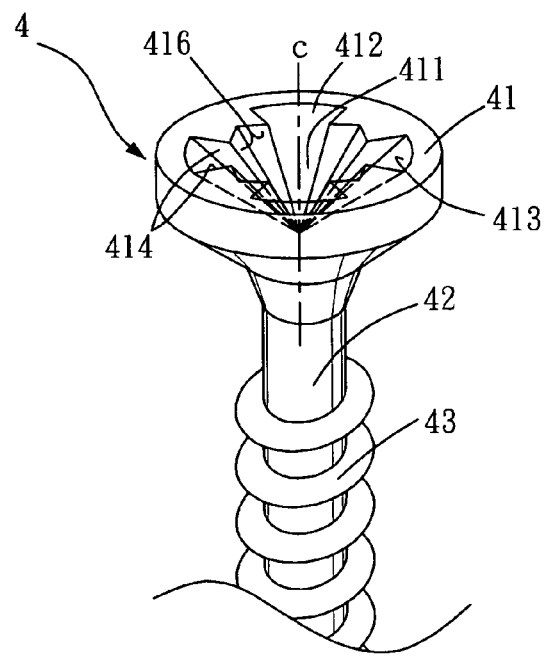
FIG. 5 is a perspective view to show the screw of U.S. Pat. No. 5,364,212.
Figure 6:
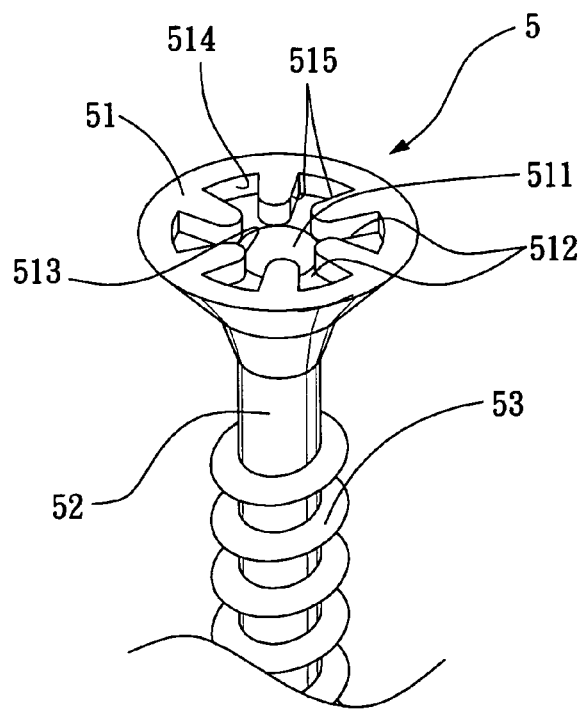
FIG. 6 is a perspective view to show the first preferred embodiment of the present invention.
Figure 7:
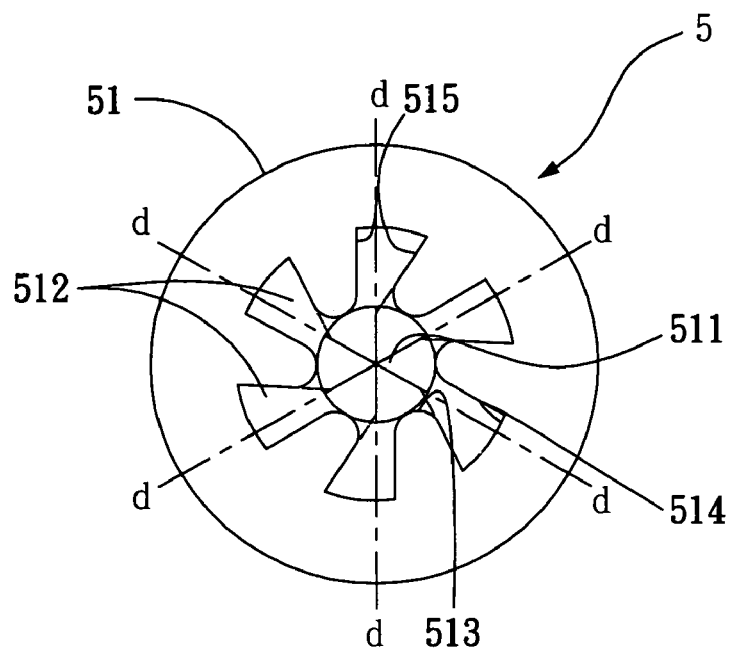
FIG. 7 is a top view of the engaging concavity of the first preferred embodiment of the present invention.
Figure 8:
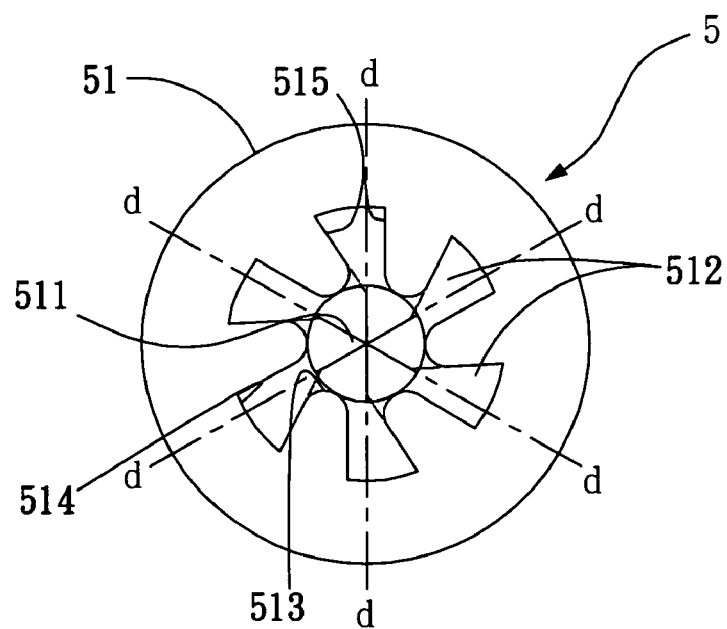
FIG. 8 is another top view of the engaging concavity of the first preferred embodiment of the present invention.

Referring to FIG. 6 to 8, the screw 5 of the present invention comprises a head 51, a shank 52 with threads 53. An engaging concavity 511 is defined in the top of said head includes a center portion and a plurality of radial recesses 512 located around and in communication with the central portion. Said radial recesses 512 are deposed respectively on the six extension lines "d" radiating outward from the centre of the engaging concavity. A separation protrusion defined between any two adjacent radial recesses includes a rounded distal surface 513. Each radial recess 512 has two insides 515 with one inside parallels to an extension line "d" and the other inside encloses an angle with extension line and an end surface 514 connected between the two insides 515 and an opening defined on the junction of the recesses and the centre portion of said engaging concavity has a width smaller than said end surface.

Figure 9:
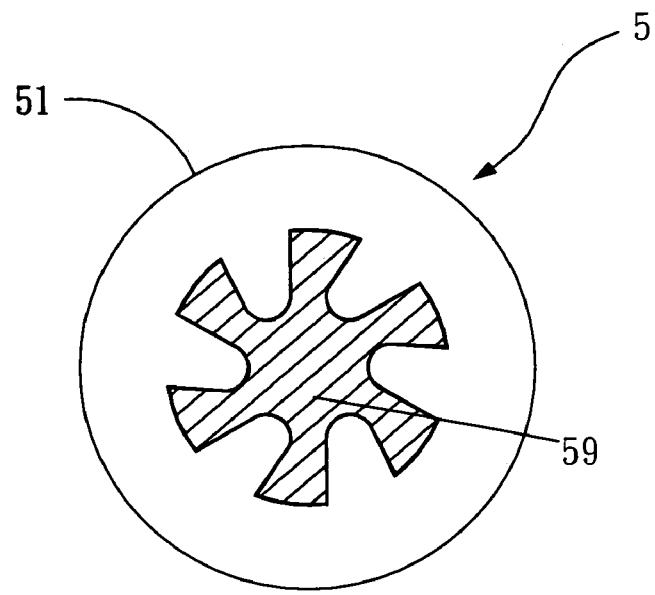
FIG. 9 is a top view of the engaging concavity of the first preferred embodiment of the present invention engaging by a screw bit.
Figure 10:
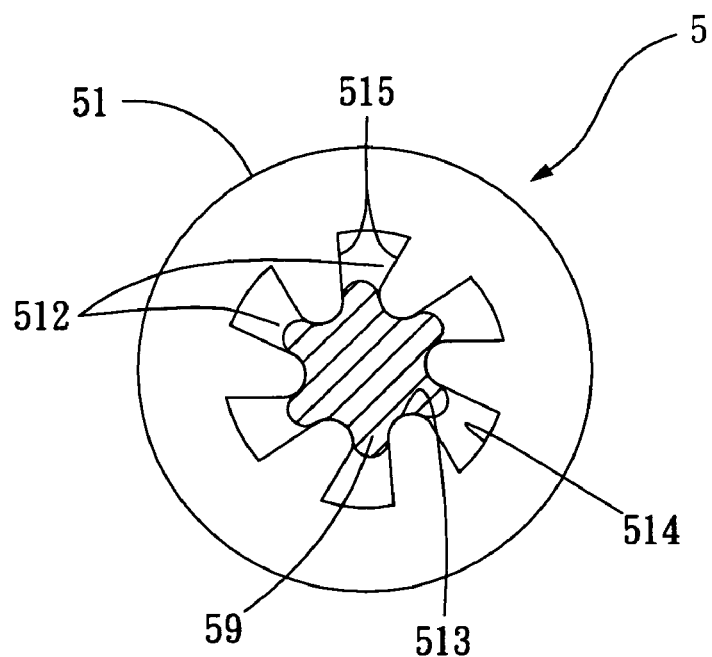
FIG. 10 is a top view of the engaging concavity of the screw of the present invention engaging by a Torx screw bit.
Figure 11:
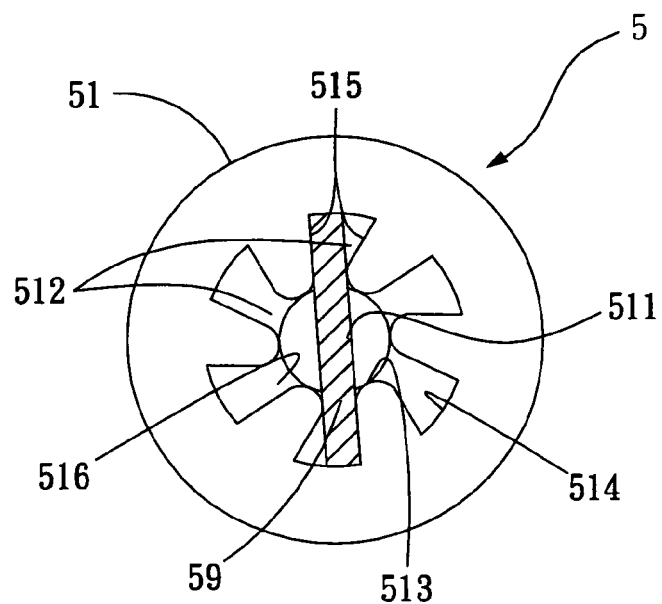
FIG. 11 is a top view of the engaging concavity of the screw of the present invention engaging by a slotted screw bit.

As shown in FIG. 9 to 11, different shapes or sizes of screw bits can be easily and securely engaged with the engaging concavity. In use, the screw bits 59 with the same shape of engaging concavity entirely contact with the two insides and due to the smaller width of the opening and one insides enclosing an angle to extension line, the screw bits can contact the insides of the radial recesses with a larger area so that the screw bits are hard to slip from the engaging concavity. Referring to FIG. 9, Torx screw bits 59 can also be used to drive the screw 5 by contacting the rounded distal surface 513 on protrusion. Referring to FIG. 10, slotted screw bits 59 can also be used to drive the screw 5 by closely contacting the inside which is paralleled to the extension line.

Figure 12:
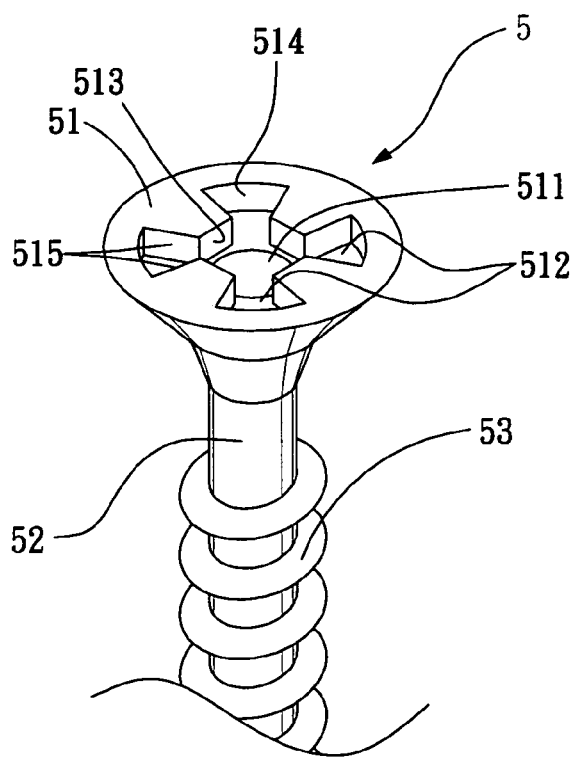
FIG. 12 is a perspective view to show the second preferred embodiment of a screw according to the present invention.
Figure 13:
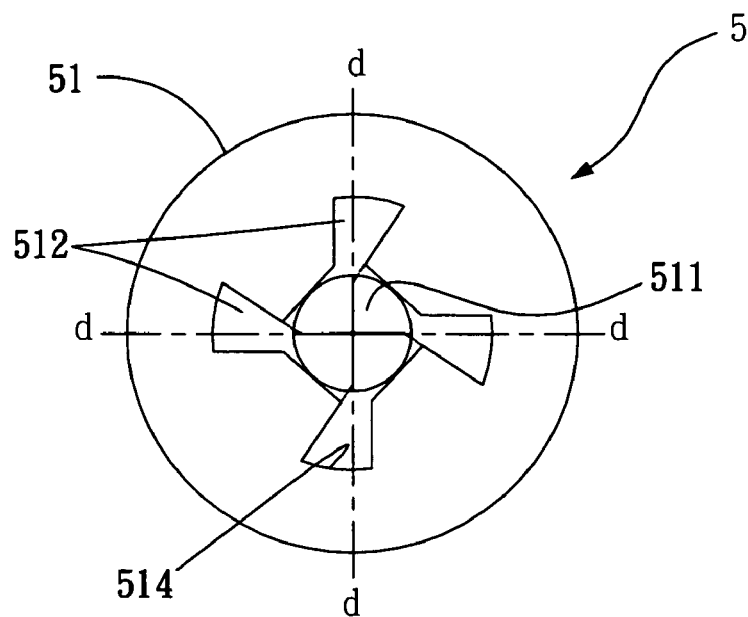
FIG. 13 is a top view of the engaging concavity of the second preferred embodiment of the present invention.
Figure 14:
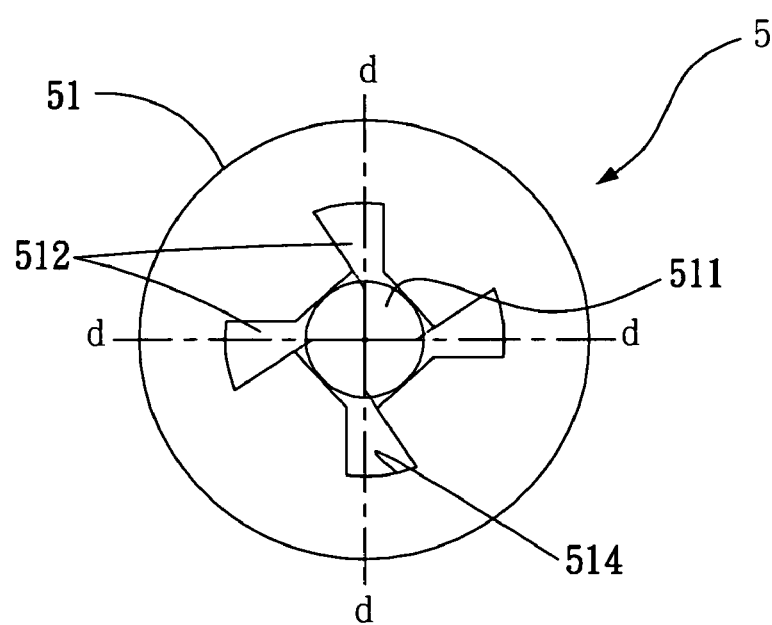
FIG. 14 is another top view of the engaging concavity of second preferred embodiment of the present invention.

As illustrated in FIG. 12 to 14, the screw 5 of the second embodiment of present invention comprises a head 51, a shank 52 with threads 53. An engaging concavity defined in the top of head includes a center portion 511 and four radial recesses 512 surrounding the center portion. Said recesses 512 are respectively located on the four extension lines "d" radiating outward from the center of the engaging concavity. In particular, the distal surface of the separation protrusion is a straight-lined surface. Due to the four recesses and the square-like shape of center portion, the screw head is able to be engaged by a slotted, square and Phillip screw bits.

Figure 15:
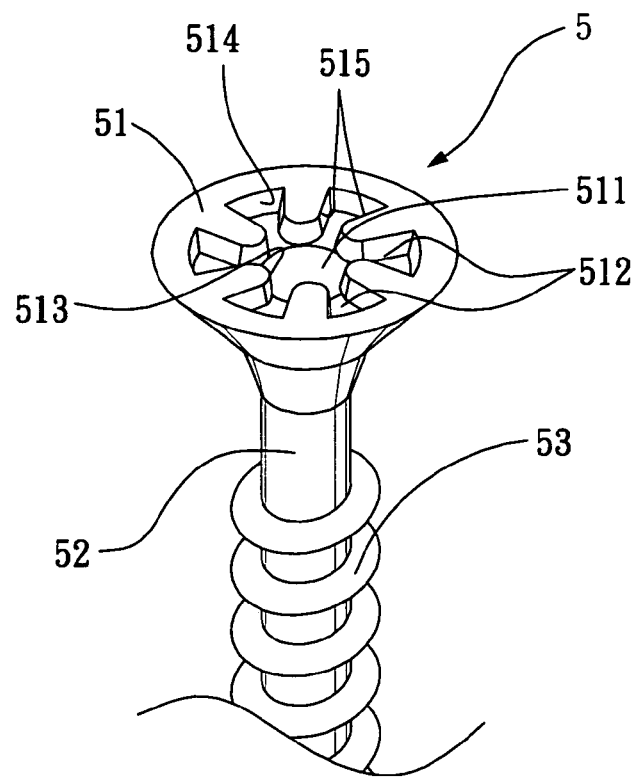
FIG. 15 is a perspective view to show the third preferred embodiment of the present invention.
Figure 16:
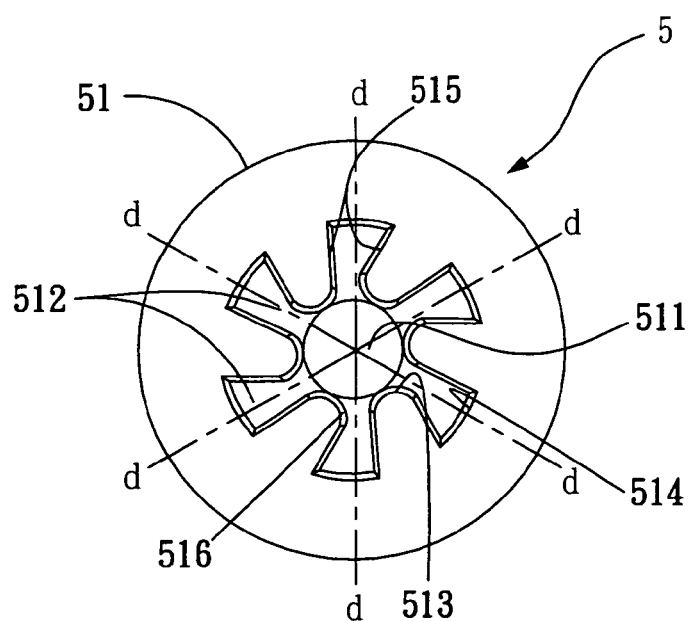
FIG. 16 is a top view of the engaging concavity of the third preferred embodiment of a screw according to the present invention.

Referring to FIGS. 15 and 16, a third embodiment of the present invention is illustrated. Basically, the third embodiment has the features of the above first embodiment except the insides 515 and the end surface 514 of each recess 512 are inclined faces which are divergent from a lower portion toward an upper portion. Each separation protrusion also includes an inclined surface 513 at a distal end thereof. By the means of inclined faces, the engaging concavity 511 is able to receive a screw bit when it is not exactly match to the engaging concavity and reduces the shaking of the screw bit during rotating the screw.

Figure 17:
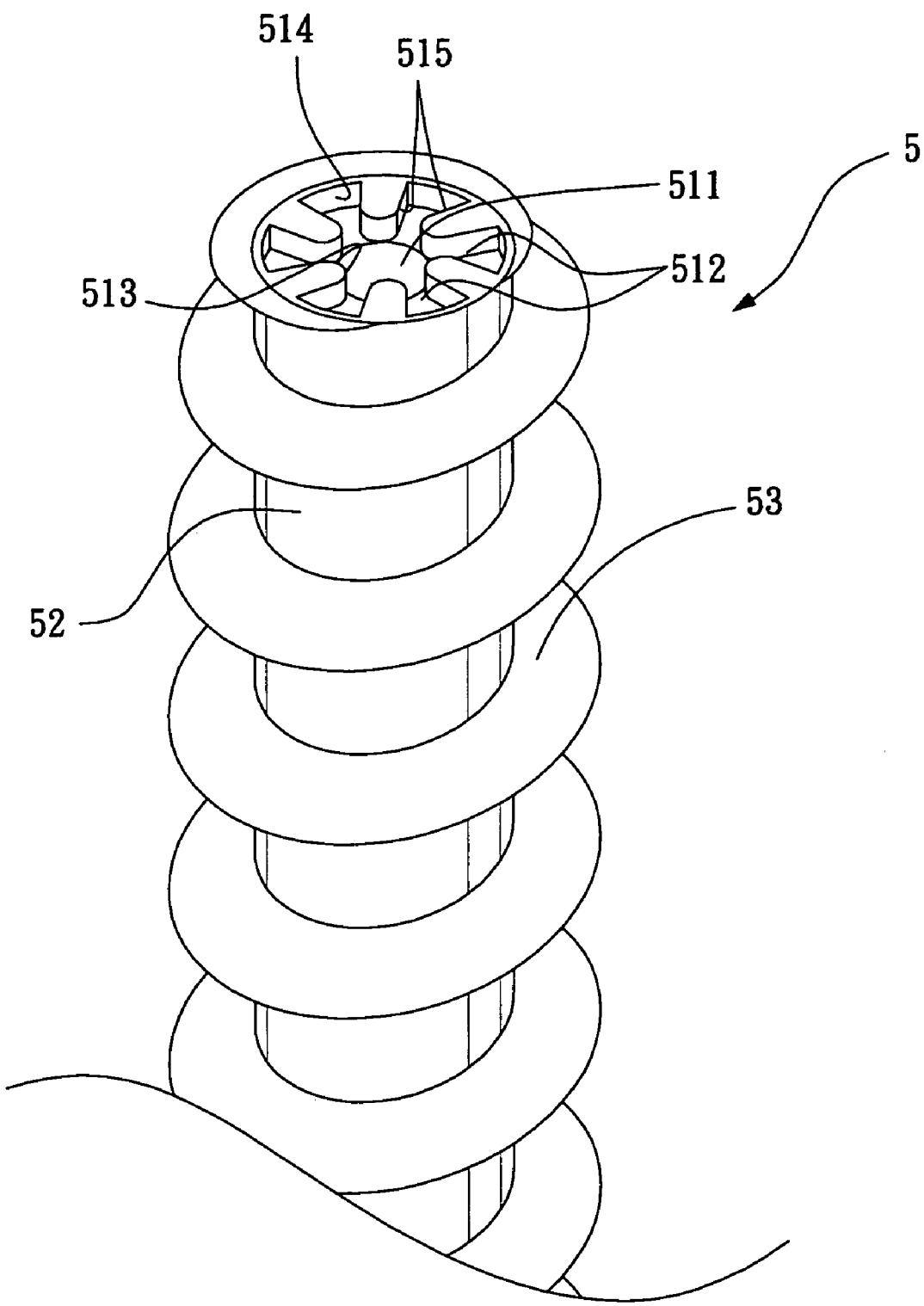
FIG. 17 is a perspective view to show the forth preferred embodiment of a screw according to the present invention.

Referring to FIG. 17, shows that the engaging concavity as shown in FIGS. 7, 8, 13 and 14 can be used in a screw that has no enlarged head.

To sum up with above description, the present invention provides the following advantages:

1. Various Screw Bits Accommodation

Due to the number of radial recesses, the engaging concavity on the head is able to accommodate Phillip, slotted, Torx and pozi screw bits.

2. Prevent the Screw Bit from Slipping

By closely contacting the recess inside which is paralleled to the extension line, the screw bit is hard to slip from the engaging concavity.

While we have shown and described the embodiment in accordance with the present invention, it should be clear to those skilled in the art that further embodiments may be made without departing from the scope of the present invention.

I claim:

1. A screw comprising:
   a head and a shank with threads, said head having an engaging concavity defined therein including a central portion and a plurality of radial recesses located around and in communication with the central portion; said recesses extending respectively outward along extension line references defined diametrically through a center of the engaging concavity and an opposed pair of said radial recesses; each radial recess including two inside surface portions disposed asymmetrically about the extension line reference thereof, with one inside surface portion extending in parallel to the extension line reference and the other inside surface portion being angled outward relative to the extension line reference, an end surface portion extending between the two inside surface portions, whereby an opening defined by adjacent recesses at the central portion has width smaller than said end surface portion.

2. The screw as claim in claim 1, wherein a separation protrusion with a rounded distal surface portion is located between each adjacent pair of radial recesses.

3. The screw as claimed in claim 1 or 2, wherein the surface portions of the radial recesses are inclined to a central axis of the shank.

4. The screw as claimed in claim 2, wherein the surface portion of each separation protrusion is inclined to a central axis of the shank.

5. The screw as claimed in claim 1, wherein each said recess end surface portion is inclined to a central axis of the shank.

* * * * *